(12) United States Patent  
Kanbe (10) Patent No.: US 7,964,076 B2  
(45) Date of Patent: Jun. 21, 2011

(54) MANUFACTURING METHOD OF ELECTROPHORETIC DISPLAY SHEET, MANUFACTURING METHOD OF ELECTROPHORETIC DISPLAY DEVICE, ELECTROPHORETIC DISPLAY DEVICE, AND ELECTRONIC APPARATUS

(75) Inventor: Sadao Kanbe, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 640 days.

(21) Appl. No.: 11/470,531

(22) Filed: Sep. 6, 2006

(65) Prior Publication Data

US 2007/0121194 A1 May 31, 2007

(30) Foreign Application Priority Data

Nov. 9, 2005 (JP) .................. 2005-325471

(51) Int. Cl.  
*C02F 1/48* (2006.01)

(52) U.S. Cl. ............... 204/600; 204/192.26; 204/471; 204/606; 204/622; 204/627; 264/13; 264/7; 264/8; 359/296; 345/107

(58) Field of Classification Search ........... 359/296; 345/107; 264/7, 8, 13; 430/32–35, 38, 138; 204/192.26, 471, 478, 486, 518, 600, 606, 622, 627

See application file for complete search history.

(56) References Cited

U.S. PATENT DOCUMENTS

| 4,423,103 | A | * | 12/1983 | Bogdany | 428/95 |
| 4,701,019 | A | * | 10/1987 | Fitzpatrick | 359/453 |
| 6,067,185 | A | | 5/2000 | Albert et al. | |
| 6,717,716 | B2 | | 4/2004 | Kawai | |
| 6,724,520 | B2 | * | 4/2004 | Kawai | 359/296 |
| 6,930,818 | B1 | * | 8/2005 | Liang et al. | 359/296 |

FOREIGN PATENT DOCUMENTS

| JP | A-2000-066247 | 3/2000 |
| JP | A-2002-086424 | 3/2002 |
| JP | A-2002-318396 | 10/2002 |
| JP | A-2005-070462 | 3/2005 |
| JP | A 2005-84268 | 3/2005 |

* cited by examiner

*Primary Examiner* — Evelyn A. Lester  
(74) *Attorney, Agent, or Firm* — Oliff & Berridge, PLC (57) ABSTRACT

A method of manufacturing an electrophoretic display sheet, comprising: forming a wall material on a first substrate, the wall material defining a disposing region; disposing a plurality of microcapsules to the disposing region, each of the plurality of microcapsules including an electrophoretic dispersion liquid in a shell; and arranging at least a part of the plurality of microcapsules on the disposing region by rubbing the wall material with a plate to sweep the plurality of microcapsules.

13 Claims, 8 Drawing Sheets

MANUFACTURING METHOD OF ELECTROPHORETIC DISPLAY SHEET, MANUFACTURING METHOD OF ELECTROPHORETIC DISPLAY DEVICE, ELECTROPHORETIC DISPLAY DEVICE, AND ELECTRONIC APPARATUS

BACKGROUND

Technical Field

The present invention relates to a method for manufacturing an electrophoretic display sheet, a method for manufacturing an electrophoretic display, an electrophoretic display, and an electronic apparatus.

Generally, it is known that fine particles move (migrate) in a liquid by a coulomb power if an electrical field is applied to a dispersal system which fine particles are dispersed into a liquid. This phenomena is called an electrophoresis and an electrophoretic display which displays a desired information (image) by using the electrophoresis has got an attention as a new display, recently.

The electrophoretic display includes a display memory and a wide viewing angle in a state that a voltage is not applied, and an ability of high-contrast display with low power consumption.

Since the electrophoretic display is not an emissive-type device, it cares our eyes more than an emissive-type display such as a cathode-ray tube.

As such an electrophoretic display, a microcapsule-type device is known in which a plurality of microcapsules encapsulating electrophoretic particles and a liquid phase dispersion medium between a pair of substrates which have electrodes, and a binder fixing each substrate and microcapsules are disposed.

As a method for disposing microcapsules, for example, the following example referred to U.S. Pat. No. 6,067,185 is cited: a method for coating microcapsule dispersion liquid including a plurality of microcapsules, a binder, and dispersion medium onto the substrates by a knife-shape blade (a jig having a plate shape).

Figure 8:
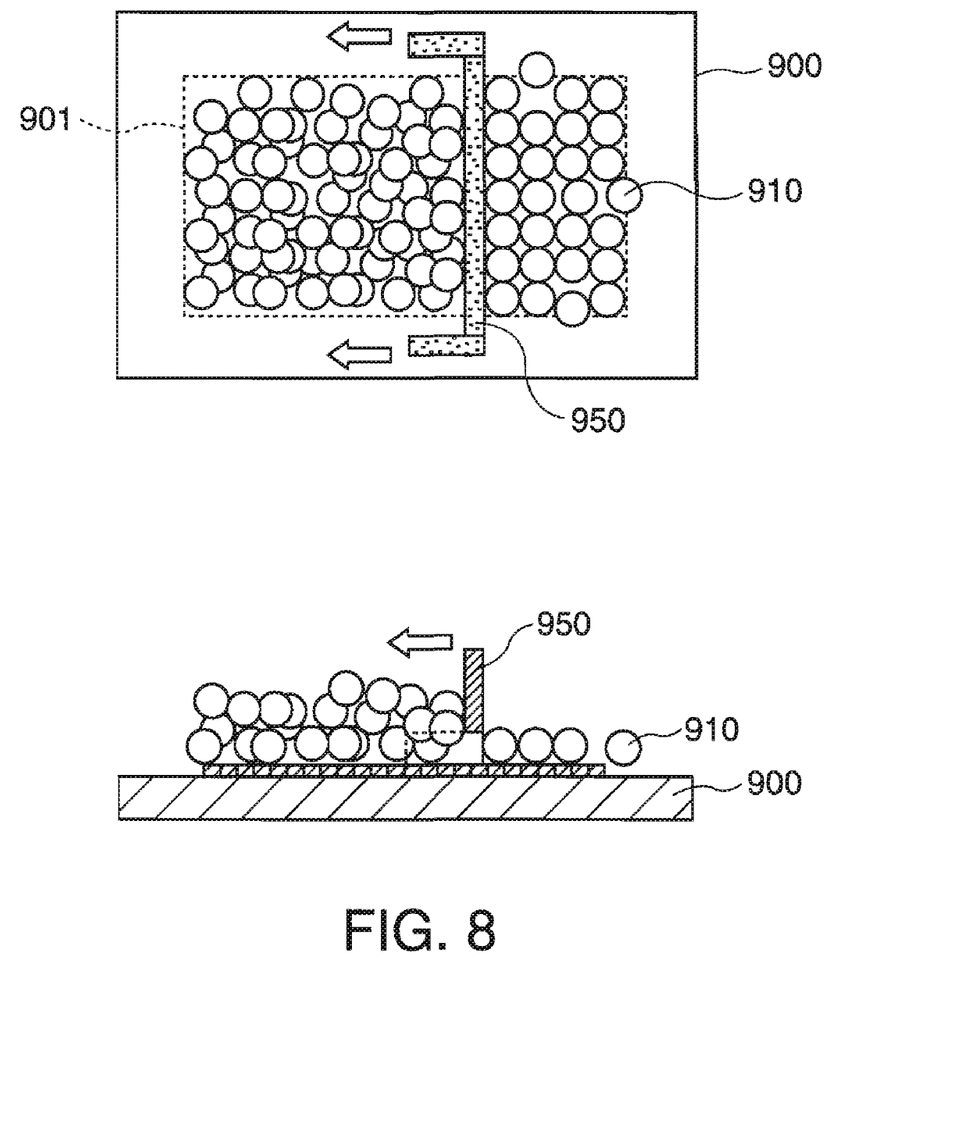
FIG. 8 illustrates a related art method for coating microcapsule dispersion liquid.

FIG. 8 illustrates a related art method for coating microcapsule dispersion liquid.

In the method illustrated in FIG. 8, microcapsule dispersion liquid is provided to a region 901 that is on a substrate 900 and that a plurality of micro capsules 910 are disposed. Next, a blade 950 is held on a predetermined height from the substrate 900, and relatively moved in parallel with the substrate 900 as it sweeps microcapsule dispersion liquid on the substrate 900. Accordingly, the microcapsules are leveled in a uniform thickness so that it is possible to dispose the microcapsules 910 on the region 901 that is predetermined.

While, in a case where the microcapsules disposed in this method are inserted between a pair of substrates, a distance between the substrates changes depending on an external diameter of the microcapsules, so that it is hard to keep the distance constant.

Then, as referred to JP-A-2005-84268 for example, a ball shaped or pillar shaped gap member is provided between the pair of substrates that the microcapsules are interposed to fix the substrates by the gap member, thus, an electrophoretic display having a defined distance between the substrates is proposed.

Though, applied microcapsule dispersion liquid easily flows out from an edge of the region on which the microcapsules are to be disposed, so that an outline on the edge easily becomes a disappointing form. Consequently, a disfigurement may be incurred on an obtained appearance of the microcapsule dispersion liquid.

There is a problem that the microcapsules located on the edge are transformed to be broken when one substrate is laid on the other substrate while putting the microcapsules and the gap member between them.

SUMMARY

An advantage of the present invention is to provide a method for manufacturing an electrophoretic display sheet that enables to manufacture easily and reliably an electrophoretic display sheet having a superior aesthetic aspect and a superior display performance, and provide an electrophoretic display and an electronic appliance with a higher reliability by the method for manufacturing an electrophoretic display.

According to a first aspect of a method for manufacturing an electrophoretic display sheet of the invention includes, (a) providing a wall material on a first substrate so as to define a region to which a microcapsule encapsulating an electrophoretic dispersion liquid including at least one kind of electrophoretic particle into a shell is disposed, and (b) arranging a disposition of the microcapsule so as to make an arrangement density of the microcapsule in the region uniform while providing the microcapsule to an inside of the wall material.

Accordingly, an electrophoretic display sheet that has a superior aesthetic aspect and a superior display performance can be easily and reliably manufactured.

In the method, the wall material may be formed in a frame shape to surround an entire circumference of the region.

Thus, a dissipation of the microcapsules is prevented more reliably, so that an outline of the region may be made an intended shape more precisely.

In step (b) of the method, after providing the microcapsule to the region that is inside of the wall material, the microcapsule may be disposed so as to make the arrangement density of the microcapsule uniform by relatively moving a squeegee to the first substrate. In such relative movement, the wall material is used as a guide to sweep the microcapsule disposed to the region.

Accordingly, the microcapsule may be filled into every corner of the region and surplus microcapsule may be evacuated out from the wall material at the same time.

In the method, the squeegee may include a positioning member at both ends in a longitudinal direction thereof. The positioning member positions the squeegee to the wall material that is approximately perpendicular to a direction in which the squeegee sweeps.

Hence, a displacement of the squeegee is avoided in the direction that is perpendicular to the direction that the squeegee sweeps, so that the microcapsule may be disposed in the region more uniformly.

In step (b) of the method, the region may be rectangular, and the squeegee may be moved by making the positioning member follow along an exterior face of the wall material provided to two faced sides of the region.

Therefore, the squeegee may be moved precisely.

In step (b) of the method, it is preferable that a minimum distance between an upper surface of the first substrate and an under surface of the squeegee be 1 through 1.9 times as large as an average diameter of the microcapsule.

Consequently, the microcapsule may be disposed in high density and disposed one by one without overlapping each other in the thickness direction (in a single layer).

In the method, the wall material may be composed mainly of a resin material.

The resin material has a superior adhesion with the microcapsule and the binder, though it is different depending on its composition. Accordingly, even if a vibration is given to an electrophoretic display sheet, a display performance such as a contrast or the like may be prevented from a deterioration that is caused the microcapsule and the binder moving over to a spacer.

In the method, it is preferable that a distance between the upper surface of the first substrate and an upper surface of the wall material be smaller than the average diameter of the microcapsule.

Accordingly, the microcapsule may be compressed in an up and down direction to be flatten. Consequently, the electrophoretic display sheet that has a superior display performance such as a contrast and the like may be obtained.

In the method, it is preferable that an average distance between the upper surface of the first substrate and the upper surface of the wall material be 0.3 through 0.8 times as large as the average diameter of the microcapsule.

Accordingly, the display performance of the electrophoretic display sheet may be more advanced while they are prevented from breaking.

A method for manufacturing an electrophoretic display according to a second aspect of the present invention includes (c) providing a wall material on a first substrate so as to define a region to which a microcapsule encapsulating an electrophoretic dispersion liquid including at least one kind of electrophoretic particle into a shell is disposed, (d) arranging a disposition of the microcapsule so as to make an arrangement density of the microcapsule in the region uniform while providing the microcapsule to an inside of the wall material, and (e) overlapping a first substrate and the second substrate with the microcapsule and the wall material that is used as a spacer interposed between the first substrate and the second substrate.

Accordingly, an electrophoretic display that has a superior aesthetic aspect and a superior display performance may be easily and reliably manufactured.

In step (e) of the method, the wall material is made mainly of a thermoplastic resin; and the first substrate and the second substrate are overlapped with the spacer interposed between the first substrate and the second substrate by fusion bonding the spacer to the first substrate and the second substrate.

Thus, the wall material and the a pair of substrates may be bonded and fixed by a strong bonding power based on a chemical interaction without using new inclusions such as an adhesion layer. Therefore, a sealed space that has a superior air-tightness and a superior liquid-tightness may be made, so that the microcapsule and the binder may be encapsulated while the sealed space keeps its high air-tightness and its high liquid-tightness.

In the method, it is preferable that a heating temperature in the fusion bonding be higher than a fusing point of the thermoplastic resin and lower than a fusing point of a constituent material of the shell of the microcapsule.

Therefore, the microcapsule may be fusion bonded and fixed reliably while they are prevented from a change in quality and deterioration that are caused by the heat.

In step (e) of the method, it is preferable that the first substrate and the second substrate are overlapped with the spacer interposed between the first substrate and the second substrate while the first substrate is relatively moved closer to the second substrate to compress the microcapsule.

Consequently, the electrophoretic display that has a superior display performance such as a contrast and the like may be provided.

In step (e) of the method, it is preferable that a pressure given to the microcapsule be 0.3 through 2 MPa.

Accordingly, while the microcapsule is reliably prevented from a break that is caused by the pressure, an area in the horizontal direction that color elements such as electrophoretic particles and the like take in the microcapsule is maintained sufficiently, so that the display performance of the electrophoretic display may be advanced.

An electrophoretic display according to a third aspect of the present invention is manufactured by the method for manufacturing an electrophoretic display of the second aspect.

Accordingly, an electrophoretic display with a high reliability may be obtained.

An electronic apparatus according to a fourth aspect of the present invention includes the electrophoretic display of the third aspect.

Accordingly, an electronic apparatus with high reliability may be obtained.

BRIEF DESCRIPTION OF THE DRAWINGS

The invention will be described with reference to the accompanying drawings, wherein like numbers reference like elements.

DESCRIPTION OF THE PREFERRED EMBODIMENTS

A method for manufacturing an electrophoretic display sheet, a method for manufacturing an electrophoretic display, an electrophoretic display, and an electronic apparatus will now be described in detail based on preferred embodiments with reference to the accompanying drawings.

First, an electrophoretic display according to one embodiment of the present invention will be described.

Figure 1:
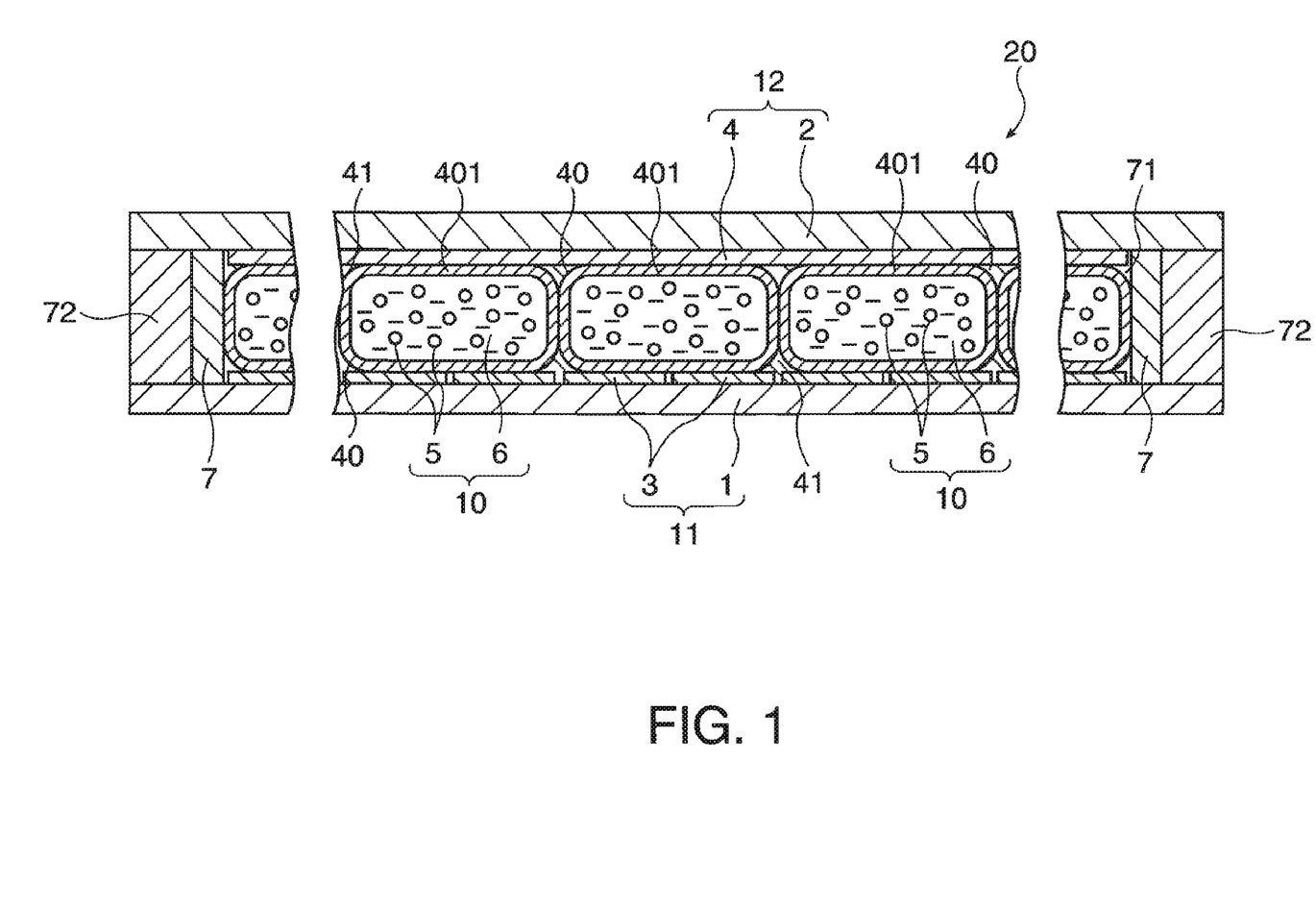
FIG. 1 is a longitudinal-sectional view schematically illustrating an electrophoretic display according to a first embodiment of the present invention.

FIG. 1 is a longitudinal-sectional view schematically illustrating an electrophoretic display of the embodiment. In the following description, the upper side in FIG. 1 is described as "up", while the lower side in FIG. 1 is described as "lower" for simplifying the description.

An electrophoretic display 20 includes a first substrate (one substrate) 11 provided with a first base 1 and a first electrode 3, a second substrate (the other substrate) 12 provided with a second base 2 and a second electrode 4 opposing the first electrode 3, a plurality of microcapsules 40 that are disposed between the first substrate 11 and the second substrate 12 and encapsulates electrophoretic dispersion liquid 10, and a binder 41. A structure of each element will now be described sequentially.

Each of the first base 1 and the second base 2 is formed of a sheet (flat) member, and supports and protects each component disposed between them.

Though each of the base 1 and the base 2 can be flexible or hard, it is preferable to be flexible. Using the base 1 and the base 2 that have flexibility provides the electrophoretic display 20 which is flexible and useful for constituting an electronic paper for example.

In a case where each of the base 1 and the base 2 has flexibility, for example, the following is cited as its constituent materials: polyethylene, polypropylene, ethylene-polyolefin such as vinyl acetate copolymer and the like, modified polyolefin, polyamide (examples: nylon-6, nylon-46, nylon-66, nylon-610, nylon-612, nylon-11, nylon-12, nylon-6-12, nylon-6-66), thermoplastic polyimide, liquid crystal polymer such as aromatic polyester, poly-phenylene oxide, polyphenylene sulfide, polycarbonate, polymethyl methacrylate, polyether, polyether ether ketone, polyetherimide, polyacetal; various thermoplastic elastomers and the like such as styrene series, polyolefine series, polyvinylchloride series, polyurethane series, polyester series, polyamide series, polybutadiene series, transpolyisoprene series, fluororubber series, chlorinated polyethylene series and the like; copolymer which contains the above materials mainly; blended materials; polymer alloy; and the like. One or two or more of the mixture of the above materials can be used.

The (average) thickness of the base 1 or the base 2 is determined depending on its constituent material, its application, or the like accordingly. If the base 1 or the base 2 has flexibility, though it is not limited, it is preferable that the thickness be approximately 20 through 500 μm, more preferably 25 through 250 μm. Accordingly, the electrophoretic display 20 can be downsized (especially thinned) while harmonizing its flexibility and strength.

On sides facing the plurality of microcapsules of the base 1 and the base 2, in other words, on the upper surface of the base 1 and the under surface of the base 2, the first electrode 3 and the second electrode 4 that are layered are provided.

A voltage is applied between the first electrode 3 and the second electrode 4, which produces an electric field that applies to electrophoretic particles (display particles) 5.

In the embodiment, an active matrix type display is described. In the active matrix type display, the second electrode 4 is a common electrode, the first electrode 3 is an individual electrode divided into a matrix state (line-column state), and a part on which the second electrode 4 and one of a plurality of the first electrode 3 overlap makes one pixel. The second electrode 4 may be divided into a plurality of electrodes as the first electrode 3. A passive matrix display that the first electrode 3 is divided in a stripe state and the second electrode 4 is divided in the same state is also acceptable.

Constituent materials of each of the electrode 3 and the electrode 4 are not limited, as long as they are conductive substantially. The following is cited as their conductive materials: a metallic material such as copper, aluminum, nickel, cobalt, platinum, gold, silver, molybdenum, tantalum, alloys of above materials, and the like; a carbonaceous material such as carbon black, carbon nanotube, fullerne, and the like; an electron conductive polymer material such as polyacetylene, polypyrrole, polythiophene, polyaniline, poly (p-polyphenylene), poly (p-polyphenylene vinylene), polyflorene, polycarbazole, polysilane, derivatives of above materials, and the like; an ion electron conductive polymer material that an ionic material such as NaCl, $LiClO_4$, KCl, $H_2O$, LiCl, LiBr, LiI, $LiNO_3$, LiSCN, $LiCF_3SO_3$, NaBr, NaI, NaSCN, $NaClO_4$, $NaCF_3SO_3$, KI, KSCN, $KClO_4$, $KCF_3SO_3$, $NH_4I$, $NH_4SCN$, $NH_4ClO_4$, $NH_4CF_3SO_3$, $MgCl_2$, $MgBr_2$, $MgI_2$, $Mg(NO_3)_2$, $MgSCN_2$, $Mg(CF_3SO_3)_2$, $ZnCl_2$, $ZnI_2$, $ZnSCN_2$, $Zn(ClO_4)_2$, $Zn(CF_3SO_3)_2$, $CuCl_2$, $CuI_2$, $CuSCN_2$, $Cu(ClO_4)_2$, $Cu(CF_3SO_3)_2$, or the like is dispersed in a matrix resin such as polyvinyl alcohol, poly carbonate, polyethylene oxide, polyvinyl butyral, polyvinyl carbazole, vinyl acetate, and the like; and a conductive oxide material such as indium tin oxide (IO), fluoride doped tin oxide (FTO), tin oxide ($SnO_2$), and indium oxide (IO). One or two or more of the mixture of the above materials can be used As other constituent materials of each of the electrode 3 and the electrode 4, the following is available: for example, various composite materials that a conductive property is provided by mixing a conductive material (conductive particle) such as gold, silver, nickel, carbon, and the like to a non-conductive material such as a glass material, a rubber material, a polymer material and the like.

As specific examples of the composite materials, the following materials are cited: a conductive rubber that a conductive material is mixed in a rubber material; a conductive adhesive or a conductive paste that a conductive material is mixed in an adhesive composition such as epoxy, urethane, acrylic and the like; and a conductive resin that a conductive material is mixed in a matrix resin such as polyolefin, polyvinyl chloride, polystyrene, ABS resin, nylon (polyamide), ethylene vinyl acetate polymer, polyester, acrylic resin, epoxy resin, urethane resin, and the like.

The (average) thickness of the electrode 3 or the electrode 4 is determined depending on its constituent material, an application, or the like accordingly. It is not limited, but it is preferable that the thickness be approximately 0.05 through 10 μm, more preferably 0.05 through 5 μm.

In each of the base 1 and the base 2 and each of the electrode 3 and the electrode 4, one base and one electrode disposed on the side of the display surface (the second base 2 and the second electrode 4 in the embodiment) have an optical transparency, in particular, they are transparent (colorless transparent, colored transparent, or translucent) substantially. Accordingly, the state of the electrophoretic particles 5 in electrophoretic dispersion liquid 10 mentioned below, or information (image) displayed in the electrophoretic display 20 can easily be recognized visually.

Each of the electrode 3 and the electrode 4 may have a multilayer laminate structure, for example, that a plurality of materials are superposed one upon another as well as the aforementioned single layer structure made of a single material. Specifically, each of the electrode 3 and the electrode 4 may have a single layer structure made of ITO, and may have a two-layer laminate structure that includes an ITO layer and a polyaniline layer, for example.

A spacer 7 that defines a gap between the first substrate 11 and the second substrate 12 (a gap between the first electrode 3 and the second electrode 4 in the embodiment) is provided near the sides of the electrophoretic display 20 and also between the first base 1 and the second base 2.

The spacer 7 is formed in a frame shape along a periphery of the region in which the microcapsules 40 are disposed. Therefore, a sealed space 71 is provided (formed) by the first substrate 11, the second substrate 12, and the spacer 7. Specifically, the under surface and the upper surface of the spacer 7 are bonded air-tightly to the upper surface of the first substrate 1 and the under surface of the second substrate 2 respectively. Accordingly, air-tightness and liquid-tightness of the sealed space 71 can be maintained.

The plurality of microcapsules 40 in which the electrophoretic dispersion liquid is encapsulated are disposed and fixed by the binder 41 in the sealed space 71 (inside space of a cell). The microcapsules 40 and the binder 41 are sealed substantially in the sealed space 71 by the function of the spacer 7 as a sealing member. Accordingly, atmospheric water vapor is prevented from entering the sealed space 71, which substantially prevents the microcapsules 40 from their change in quality and deterioration that are caused by their moisture absorption.

The electrophoretic display 20 includes such the first substrate 11, the second substrate 12, the plurality of microcapsules 40, and the spacer 7 mentioned above.

As constituent materials of the spacer 7, the following is cited: for example, various resin materials such as thermoplastic resin including acrylic resin, urethane-based resin, or olefinic resin; and thermoset resin including epoxy resin, melamine resin, and phenol resin; various ceramics materials such as silica, alumina, and titania; and various metallic materials such as stainless steel, copper, and aluminum. One or two or more of the mixture of the above materials can be used.

It is preferable that the constituent materials of the spacer 7 be mainly resin material. Though it is different depending on its composition, resin is superior to attach the microcapsules 40 and the binder 41 firmly. Accordingly, even if a vibration is given to the electrophoretic display 20, its display performance and the like such as a contrast is prevented from a deterioration that is caused by the plurality of microcapsules 40 and the binder 41 moving over to the spacer 7.

The plurality of microcapsules 40 are disposed lengthwise and crosswise from side to side in a single layer (disposed one by one without overlapping each other in the thickness direction) between the first substrate 1 and the second substrate 2, and each of them attaches to the first electrode 3 and the second electrode 4. The electrophoretic display 20 provided with the microcapsules 40 formed as a single layer provides a good display performance such as a contrast and the like.

One of the microcapsules 40 is disposed on two adjacent first electrodes 3 in the embodiment. In particular, one of the microcapsules 40 is disposed to straddle two adjacent first electrodes 3.

The microcapsules 40 are made by encapsulating the electrophoretic dispersion liquid 10 into a capsule body (a shell) 401.

As constituent materials of the capsule body (a shell) 401, though it is not limited, the following is cited: for example, a complex material consisting of gum acacia or gelatin; and various resin materials such as urethane resin, melamine resin, ureaformaldehyde resin, polyamide, and polyether. One or two or more of the mixture of the above materials can be used.

It is preferable that the plurality of microcapsules 40 be approximately same-sized. Accordingly, the electrophoretic display 20 can provide better display performance.

The electrophoretic dispersion liquid 10 is made by dispersing (suspending) at least one kind of the electrophoretic particle 5 into a liquid phase dispersion medium 6.

Dispersing the electrophoretic particles 5 into the liquid phase dispersion medium 6 is enabled by one method or a combination of two or more methods of the following: a paint shaker method, a ball mill method, a media mill method, an ultrasonic dispersion method, a stirrer dispersion method, and the like, for example.

As the liquid phase dispersion medium 6, materials that have high insulation properties relatively are preferably used. As the liquid phase dispersion medium 6, the following is cited: for example, various water (distilled water, purified water, ion-exchanged water, RO water, or the like); alcohols such as methanol, ethanol, isopropanol, butanol, octanol, ethylene glycol, diethylene glycol, glycerin, and the like; cellosolves such as methyl cellosolve, ethyl cellosolve, phenyl cellosolve, and the like; esters such as methyl acetate, ethyl acetate, butyl acetate, ethyl formate, and the like; ketones such as acetone, methyl ethyl ketone, diethyl ketone, methyl isobutyl ketone, methyl isopropyl ketone, cyclohexanone, and the like; aliphatic hydrocarbons such as pentane, hexane, octane, and the like, alicyclic hydrocarbons such as cyclohexane, methyl cyclohexane, and the like; aromatic hydrocarbons such as benzenes, and the like that has a long-chain alkyl group including benzene, toluene, xylene, hexyl benzene, heptyl benzene, octyl benzene, nonyl benzene, decyl benzene, undecyl benzene, dodecyl benzene, tridecyl benzene, tetradecyl benzene; halogen hydrocarbons such as methylene chloride, chloroform, carbon tetrachloride, 1,2-dichloroethane, and the like; aromatic heterocycles such as pyridine, pyrazine, furane, pyrrole, thiophene, methyl pyrolidone, and the like; nitryles such as acetonitrile, propionitrile, acrylonitrile, and the like; amides such as N,N-dimethylformamide, N,N-dimethylacetamide, and the like; carboxylate salt; and other various oils. One or two or more in a compound of the above materials can be used.

In addition, if necessary, the following various additives may be added to the liquid phase dispersion medium 6: for example, charge controlling agents formed of particles of electrolytes, surfactants, metal soaps, resins, rubbers, oils, varnishes, compounds and the like; various dispersive agents such as titanium coupling agents, aluminum coupling agents, silane coupling agents and the like; lubricating agents; and stabilizing agents.

Moreover, if necessary, the following various dyes may be solved in the liquid phase dispersion medium 6: anthraquinone dye, azo dye, indigoid dye, triphenylmethane dye, pyrazolone dye, stilbene dye, diphenylmethane dye, xanthene dye, alizarin dye, acridine dye, quinonimine dye, thiazole dye, methine dye, nitro dye, nitroso dye, and the like.

As the electrophoretic particles 5, any particles can be used as long as they have charges and can be electrophoresed in the liquid phase dispersion medium 6 when an electric field is applied. It is not limited, but at least one kind of pigment particle, resin particle, and compound particle of the previous particles is used preferably. These particles have advantages that they are easily manufactured and their charges can be easily controlled relatively.

As pigments constituting pigment particles, the following is cited: black pigments such as aniline black, carbon black, titanium black, and the like; white pigments such as titanium dioxide, antimony trioxide, barium sulfate, zinc sulfide, zinc oxide, silicon dioxide, and the like; azole pigments such as monoazo, disazo, polyazo, and the like; yellow pigments such as isoindolinone, chrome yellow, yellow iron oxide, cadmium yellow, titanium yellow, antimony, and the like; red pigments such as quinacridone red, chrome vermilion, and the like; blue pigments such as phthalocyanine blue, indanthrene blue, iron blue, ultramarine blue, cobalt blue, and the like; and green pigments such as phthalocyanine green, and the like. One or two or more of the mixture of the above pigments can be used.

As resin materials constituting resin particles, the following is cited: for example, acrylic resin, urethane resin, urea resin, epoxy resin, polystyrene, polyester, and the like. One or two or more of the mixture of the above materials can be used.

As composite particles, for example, the following particles are cited: pigment particles that resin material coats their surfaces, resin particles that pigment coats their surfaces, and particles made of a compound that a pigment and a resin material are compounded in a suitable proportion.

It is preferable that an average particle diameter (volume average particle size) of the electrophoretic particles 5 be approximately 0.1 through 10 μm, more preferably 0.1 through 7.5 μm. If the average particle diameter of the electrophoretic particles 5 is too small, the electrophoretic display 20 possibly does not have an enough hiding ratio mostly in a visible light region, thereby deteriorating its display contrast performance. While, if the average particle diameter of the electrophoretic particles 5 is too large, in certain kinds of particles, the particles easily sink down in the liquid phase dispersion medium 6, thereby a display quality of the electrophoretic display 20 possibly deteriorates.

In the electrophoretic display 20 as above, if a voltage is applied between the first electrode 3 and the second electrode 4, the electrophoretic particles 6 are electrophoresed toward one of the electrodes while following an electric field provided between the electrodes.

Figure 2A:
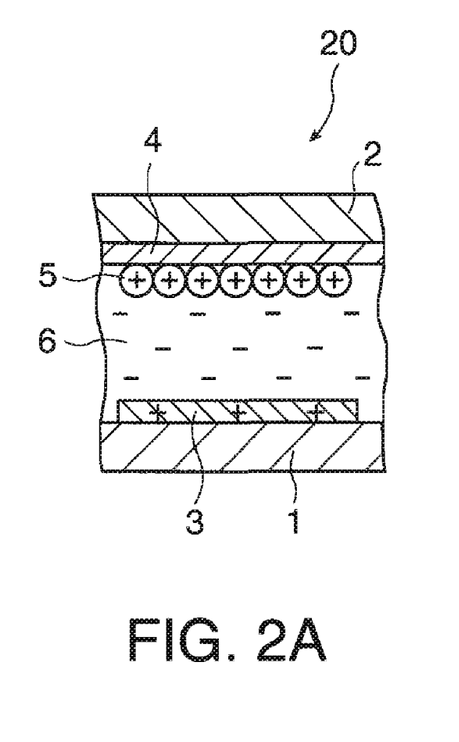
FIG. 2 is a pattern diagram showing a principle of operation of the electrophoretic display illustrated in FIG. 1.

In a case where positively-charged particles are used as the electrophoretic particles 5, if the first electrode 3 has a positive electric potential, the electrophoretic particles 5 move toward the second electrode 4 to gather there as shown in FIG. 2A. Therefore, the colors of the electrophoretic particles 5 can be seen when the electrophoretic display 20 is looked from above (at the side of the display face).

Figure 2B:
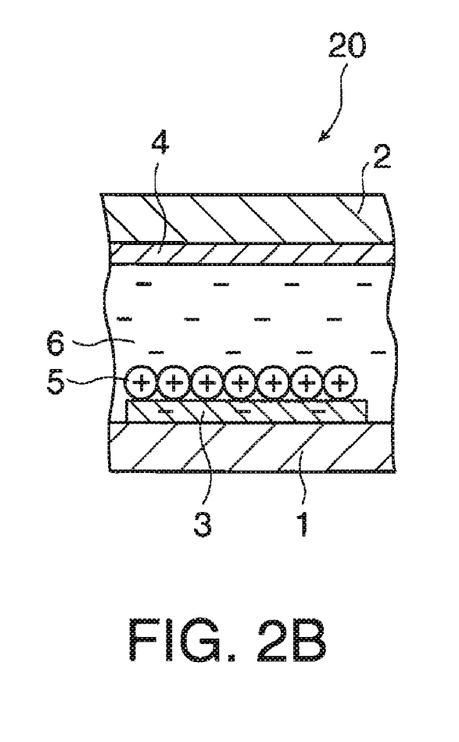

Contrary, as shown in FIG. 2B, if the first electrode 3 has a negative electric potential, the electrophoretic particles 5 move toward the first electrophoretic 3 to gather there. Therefore, the colors of the liquid phase dispersion medium 6 can be seen when the electrophoretic display 20 is looked from above (at the side of the display face).

Properties (for example, color, positive or negative, charging amount, and the like) of the electrophoretic particles 5, a polarities of the electrodes 3 and the electrodes 4, a potential difference between the electrode 3 and the electrode 4, and the like are suitably arranged to combine the colors of the electrophoretic particles 5 and the color of the liquid phase dispersion medium 6, thereby desired information (image) is displayed on the display screen of the electrophoretic display 20.

It is preferable that a specific gravity of the electrophoretic particles 5 be arranged approximately same as a specific gravity of the liquid phase dispersion medium 6. Accordingly, the electrophoretic particles 5 can stay in certain positions in the liquid phase dispersion medium 6 for a long time even after voltage applied to the electrode 3 and the electrode 4 is stopped. In other words, the information displayed on the electrophoretic display 20 is kept for a long time.

In the present embodiment, an average gap between the electrode 3 and the electrode 4 (an average gap between the electrodes) is smaller than an average diameter of the plurality of microcapsules 40 which are in a previous state that they are encapsulated to the sealed space 71. Therefore, the plurality of microcapsules 40 are compressed in the up and down direction by the electrode 3 and the electrode 4, thereby stretching out to be flattened in a horizontal direction as shown in FIG. 1. If the microcapsules 40 are transformed like above, the distance from the electrophoretic particles 5 in the microcapsules 40 to the electrodes 3 and the electrodes 4 is shortened, so that the electrophoretic particles 5 can be moved and gathered up to the predetermined electrode, while corresponding to the arrangement of the electric potential of the electrode 3 and the electrode 4. Therefore, the electrophoretic display 20 with a rapid reaction rate can be obtained.

In the microcapsules 40 shown in FIG. 1, the electrophoretic particles 5 gather in almost parallel to each of the electrode 3 and the electrode 4. More electrophoretic particles 5 gather nearer positions to the electrode 3 and the electrode 4 than the case where the microcapsule 40 has a spherical shape. Therefore, the colors of the electrophoretic particles 5 occupy larger area in a pixel, so that the pixel size becomes larger relatively. Accordingly, the electrophoretic display 20 with an improved quality of the display such as a contrast and the like to have a superior display performance can be obtained.

The binder 41 is provided, for example, for bonding the first substrate 11 and the second substrate 12, for fixing the first substrate 11, the second substrate 12, and the plurality of microcapsule 40, and for maintaining insulation properties between the electrode 3 and the electrode 4. Accordingly, durability and, reliability of the electrophoretic display 20 can be improved.

In the binder 41, resin materials are preferably used as long as they have superior affinity (adhesion) for the electrode 3, the electrode 4, and the capsule body 401 (the plurality of microcapsules 40), and has superior insulation properties.

As the binder 41, the following materials are cited: for example, thermoplastic resins such as polyethylene, chlorinated polyethylene, ethylene-vinyl acetate copolymer, ethylene-ethyl acrylate copolymer, polypropylene, AS resin, ABS resin, methyl methacrylate resin, vinyl chloride resin, vinyl chloride-vinyl acetate copolymer, vinyl chloride-vinylidene chloride copolymer, vinyl chloride-acrylic acid ester copolymer, vinyl chloride-methacrylic acid copolymer, vinyl chloride-acrylonitrile copolymer, ethylene-vinyl alcohol-vinyl chloride copolymer, propylene-vinyl chloride copolymer, vinylidene chloride resin, vinyl acetate resin, polyvinyl alcohol, polyvinyl formal, cellulose-based resin, and the like; polymers such as polyamide-based resin, polyacetal, polycarbonate, polyethylene terephthalate, polybutylene terephthalate, polyphenylene oxide, polysulfone, polyamide imide, polyamino bismaleimide, polyether sulfone, polyphenylene sulfone, polyarylate, grafted polyphenylene ether, polyether ether ketone, polyether imide, and the like; fluororesins such as polyethylene tetrafluoride, polyethylene propylene fluoride, ethylene tetrafluoride-perfluoroalkoxyethylene copolymer, ethylene-ethylene tetrafluoride copolymer, polyvinylidene fluoride, polyethylene trifluorochloride, fluororubber, and the like; silicone resins such as silicone resins, silicone rubber, and the like; urethane resins such as polyurethane; and as other materials, various resins such as methacrylic acid-styrene copolymer, polybutylene, methyl methacrylate-butadiene-styrene copolymer, and the like. One or two or more of the mixture of the above materials can be used.

It is preferable that a dielectric constant of the binder 41 be arranged approximately same as the one of the liquid phase dispersion medium 6. Consequently, the following dielectric regulators are preferably added to the binder 41; for example, dielectric regulators, such as alcholes including 1,2-butanediol, 1,4-butanediol, and the like; ketones; carboxylates; and the like.

The spacer 7 is provided with a coating part 72 on its outer periphery. The coating part 72 seals the outer periphery part of the electrophoretic display 20. Accordingly, the air-tightness and the liquid-tightness of the sealed space 71 can be further advanced.

As constituent materials of the coating part 72, though it is not limited, the various resins cited in the above constituent materials of the spacer 7 and the like are preferably used.

The coating part 72 may be provided as occasion demand. It does not always have to be provided.

Next, a method for manufacturing an electrophoretic display according to another embodiment of the present invention will be described.

Figure 3A:
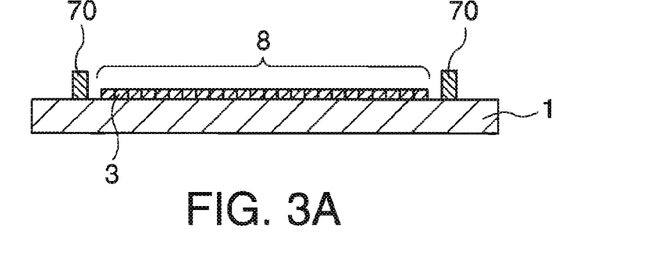
FIGS. 3A to 3C illustrate a method for manufacturing the electrophoretic display illustrated in FIG. 1 (schematic views showing a manufacturing process).
Figure 3B:
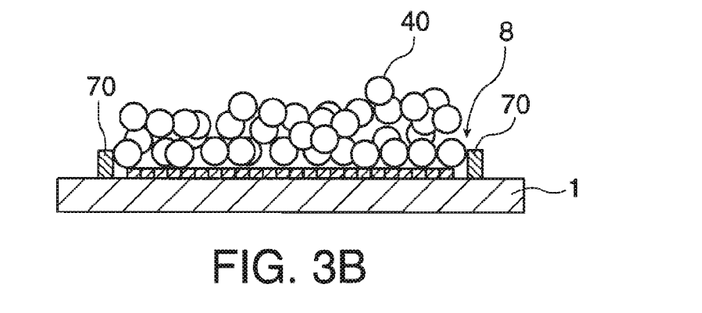
Figure 3C:
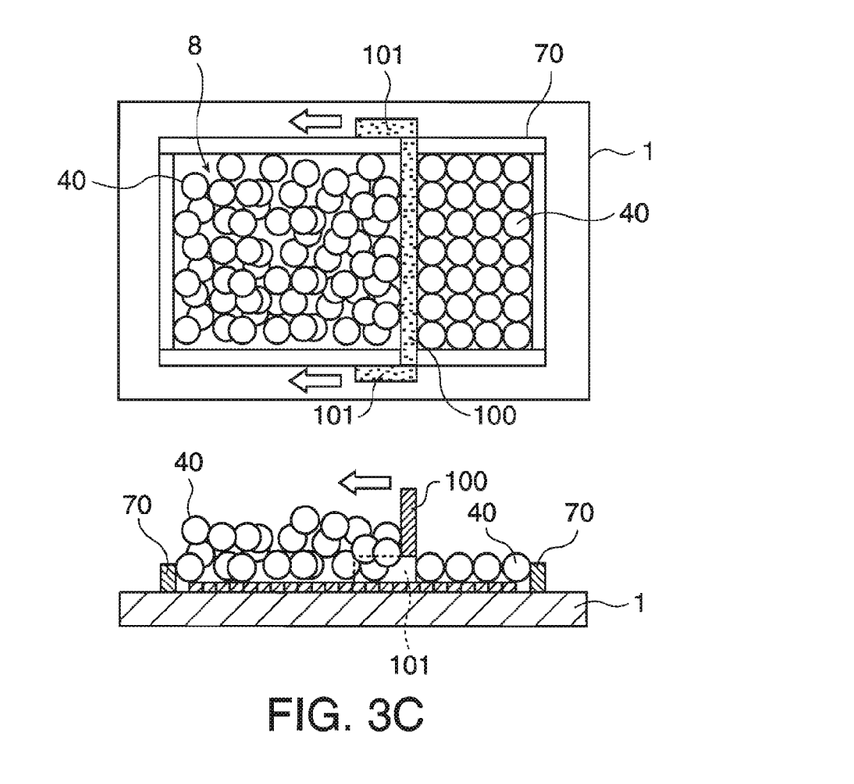

FIGS. 3A to 3C and FIGS. 4A and 4B illustrate a method for manufacturing the electrophoretic display illustrated in FIG. 1 (schematic views showing a manufacturing process). In FIGS. 3A to 3C, an electrophoretic display sheet represents a state that the plurality of microcapsules 40 are formed on the first base 1, or a state, though it is not shown, that the plurality of microcapsules 40 are formed on the second base 2. Anyhow, in FIGS. 4A and 4B, it is a half-finished product that the first base 1 and the second base 2 are not put together, and is distributed independently on business transactions. Generally, the second base 2 on which the microcapsules 40 are formed is called front plane, and the first base 1 on which a switching element is formed is called back plane. The electrophoretic display sheet of the embodiment includes the front plane. In the following description, the upper side in FIGS. 3A to 3B and FIGS. 4A and 4B is described as "up", while the lower side is described as "lower".

1. Process of Manufacturing Microcapsules 40

First, a process for manufacturing the plurality of microcapsules 40 encapsulating the electrophoretic dispersion liquid 10 is described.

As the method for manufacturing the microcapsules 40 (a method for encapsulating the electrophoretic dispersion liquid 10 into the capsule body 401), though it is not limited, the following methods can be used: for example, various microcapsulating methods such as interfacial polymerization method, In-situ polymerization method, phase separation method (or coacervation method), interfacial sedimentation method, spray dry method, and the like. A suitable microcapsulating method may be selected from the methods mentioned above depending on a constituent material and the like of the microcapsules 40.

The microcapsules 40 which have similar sizes each other can be provided by sieve separating method, filtration method, specific gravity difference classification method, and the like.

The average diameter of the microcapsules 40 is preferably about 20 through 200 μm, and more preferably 30 through 100 μm. If the average diameter of the microcapsules 40 is out of the range of the preferable average diameter mentioned above, it becomes difficult to control the electrophoretic particles 5, and consequently it becomes difficult to receive a desired display image in the electrophoretic display 20 to be manufactured.

2. Process of Manufacturing Microcapsule Dispersion Liquid

Next, a preparing process of the microcapsule dispersion liquid including the microcapsules 40 manufactured as mentioned above, the binder 41, and the dispersion medium (especially an aqueous solvent) is described. In this case, the microcapsule dispersion liquid can be prepared, for example, by dispersing the binder 41 and the microcapsules 40 in the dispersion liquid.

As a dispersion medium, high hydrophilic (a low hydrophobic) solvent (aqueous solvent) is preferable. In particular, the following aqueous solvents are cited: various waters (distilled water, deionized water, ion-exchanged water, RO water, or the like); lower alcohols such as methanol, ethanol, isopropanol, butanol, or the like. Waters are especially preferable among these. A low hydrophobic substituent such as methoxy and the like can be introduced into the lower alcohols. By means of using the aqueous solvents mentioned above, the solvents are restrained from infiltrating the microcapsules 40, so that the microcapsules 40 are more reliably kept from swell and solution that are caused by the solvent infiltrating.

A density (a contained amount) of the binder 41 in the microcapsule dispersion liquid excluding the microcapsules 40 is preferably 50 wt % or less, more preferably about 0.05 through 25 wt %.

A viscosity of the microcapsule dispersion liquid can be made a preferable value by arranging the density of the binder 41 as mentioned above. Hence, the microcapsules 40 can be easily and reliably moved in a process, described below, of providing the microcapsule dispersion liquid to fill in gaps between the microcapsules 40.

The density of the microcapsule dispersion liquid is preferably about 1 through 1000 cP (25 deg. centigrade), more preferably 2 through 700 cP (25 deg. centigrade).

A contained amount of the microcapsules 40 in the microcapsule dispersion liquid is preferably about 10 through 80 wt %, more preferably about 30 through 60 wt %.

If the contained amount of the microcapsules 40 is arranged as mentioned above, it is very favorable to dispose the microcapsules 40 between the first substrate 11 and the second substrate 12 in high density and in one-by-one (in single-layered) without them overlapping each other in a thickness direction.

3. Process of Forming Wall Material (First Process)

As shown in FIG. 3A, on the first base 1, a wall material 70 is formed in a frame shape surrounding an entire circumference of a region 8 thereby defining the region 8 on which the microcapsules 40 should be disposed in a process described below. In the embodiment, the region 8 is rectangular in shape when viewed from the above, and the wall material 70 is formed on four sides of the rectangular region 8.

The wall material 70 can be formed in any method. The following methods can be used: for example, methods of fixing a frame-shaped member such as fusion bonding methods including a thermal fusion bonding and the like, and bonding methods such as bonding by an adhesive tape, an adhesion bond, an adhesive, and the like; methods of forming by printing such as an ink jet method, and the like; and methods of leaving a frame-shaped part such as in a machine process, an etching process, a laser process, and the like on the first base 1.

4. Process of Providing Microcapsules (Second Process)

Next, as shown in FIG. 3B, the microcapsule dispersion liquid is provided in the region 8 (inside of the wall material 70) while arranging dispositions of the microcapsules 40 to uniform an arrangement density of them.

It is preferable to provide enough microcapsule dispersion liquid to make its surface be higher than the upper surface of the wall material 70. Consequently, the microcapsules 40 can be pervaded into every corner of the region 8 thereby filling in the region 8 uniformly and reliably.

As a method of providing the microcapsule dispersion liquid, though it is not limited, the following can be used: for example, various coating methods such as a spin coat method, a dip coat method, a spray coat method, and the like.

As shown in FIG. 3C, a squeegee (a jig having a plate shape) 100 is moved through over the region 8 to sweep the microcapsules 40. Therefore, the microcapsules 40 can fill into every corner of the region 8 and surplus microcapsule dispersion liquid can be drained out from the wall material 70 at the same time.

The squeegee 100 shown in FIG. 3C is used for leveling the microcapsules 40 touching the under surface of the squeegee 100. The squeegee 100 is composed of a knife shaped lamella and is disposed with its face facing almost parallel to a vertical direction. The under surface of the squeegee 100 is disposed to cross the region 8.

In the embodiment, a pair of positioning members 101 and 101 is provided on both ends in the longitudinal direction of the squeegee 100. The pair of positioning members 101 and 101 identifies the positions on the sides of the wall material 70 that are located perpendicular to the direction that the squeegee 100 sweeps. Hence, the squeegee 100 is kept from displacing in the direction that is perpendicular to the direction that the squeegee 100 sweeps, so that the microcapsules 40 can be disposed in the region 8 more uniformly.

Each of the positioning members 101 and 101 is provided on each of two sides facing each other on the rectangular region 8 to move along the exterior face of the wall material 70 that is made on each side of the region 8.

By moving the positioning members 101 and 101 in the state mentioned above, the squeegee 100 can be moved with accuracy.

If the squeegee 100 moves through like it sweeps the microcapsule dispersion liquid, the microcapsules 40 are disposed uniformly in the region 8 that is inside of the wall material 70 and the surplus microcapsule dispersion liquid is drained out from the wall material 70 at the same time.

In this case, the minimum distance between the upper surface of the first electrode 3 on the region 8 and the under surface of the squeegee 100 is preferably arranged on 1 through 1.9 times as large as the average diameter of the microcapsules 40, more preferably 1.1 through 1.5 times as it. The squeegee 100 kept in a distance as mentioned above from the upper surface of the first electrode 3 can dispose the microcapsules 40 in high density and in one-by-one (in single-layered) without them overlapping each other in the thickness direction.

In related arts, as shown in FIG. 8, the microcapsule dispersion liquid is applied on a substrate that approximately spherical or columnar shaped gap materials are disposed on a desired position without using the wall material 70.

Therefore, there are problems, on an edge part of the region that the microcapsules should be disposed, in that a display area incurs a disfigurement because the microcapsules scatter out from the edge part of the region thereby an outline form of the edge part is distorted; and in that display unevenness arises because a concentration of the disposed microcapsules is uneven.

On the contrary, a wall material such as the wall material 70 is provided along the periphery of the region 8 to define the outline form of the edge part of the region 8, so that the microcapsules 40 are prevented from scattering out from the region 8 in the embodiment. Therefore, the outline form of the region 8 is provided as intended. Consequently, the electrophoretic display 20 with an excellent aesthetic aspect of the display area and a low unevenness in the display is obtained.

As mentioned above, by forming the wall material 70 as surrounding the entire circumferences of the region 8, the microcapsules 40 are more reliably prevented from scattering out, so that the outline form of the region 8 can be an intended shape.

In the embodiment, the wall material 70 can be also used as a member that makes the sealed space 71 with the first substrate 11 and the second substrate 12 on Process 5 described below.

5. Process of Encapsulating Microcapsules (Third Process)

Next, the second substrate 12 is opposite disposed to the first substrate 11 to make the upper surface of the wall material 70 touch the under surface of the second substrate 12 to make them overlapped. Specifically, the wall material 70 is laid between the first substrate 11 and the second substrate 12, and finally it is used as the part of the spacer 7 that defines the distance between the first substrate 11 and the second substrate 12. Hence, the plurality of microcapsules 40 can be encapsulated in the sealed space 71 that is made up by the first substrate 11, the second substrate 12, and the spacer 7.

In related arts, a pair of substrates is bonded and fixed each other by an adhesive action of a binder while a load is given by rollers as mentioned above, without using the wall material 70 shown in FIG. 8 or in a state that a spherical or columnar shape gap member is disposed on a substrate.

Though, if the load given by rollers is not uniform between inner surfaces of the pair of substrates, microcapsules have sometimes broken because an excessive pressure concentrates on a part of the microcapsules which are near an edge of a region that the microcapsules should be disposed.

Even if the load given by rollers is uniform between the inner surfaces of the pair of substrates, the microcapsules disposed near the edge of the region are possibly transformed toward the periphery of the substrates to break.

On the contrary, in the embodiment, the wall material 70 is provided along the periphery of the region 8 for defining the region 8, so that the amount of transformed microcapsules 40 disposed at the edge of the region 8 is restrained by the wall material 70. Hence, the microcapsules 40 are prevented from breaking at the entire region between the base 1 and the base 2.

As a method of overlapping (fixing) the first base 1 and the second base 2 with the spacer 7 interposed between them, for example, a method of fixing them by putting an adhesion layer between them is cited.

In the method of fixing by putting an adhesion layer between the bases, since they can be fixed in a short time relatively at room temperature, the heat affection to the microcapsules 40, the binder 41, and the like can be ignored. Therefore, the electrophoretic display 20 that has a superior display performance can easily be obtained.

As an adhesion layer, for example, an adhesive, an agglutinant, an adhesive sheet, and the like are cited.

Using the method mentioned above enables to fix the first base 1 and the second base 2 with the spacer 7 interposed between them without the constituent material of the wall material 70 (the spacer 7) considered.

In a case where the wall material 70 (the spacer 7) is made mainly of a thermoplastic resin, as a method of overlapping the first base 1 and the second base 2 with the spacer 7 interposed between them, a method of fixing them by a fusion bonding is preferably used.

In the method mentioned above, the wall material 70, the first base 1, and the second base 2 can be bonded and fixed by a strong bonding power based on the chemical interaction without using a new inclusion such as an adhesion layer. Accordingly, the sealed space 71 that has a superior airtightness and a superior liquid-tightness can be made up, which makes possible to encapsulate the plurality of microcapsules 40 and the binder 41 while keeping a high airtightness and a high liquid-tightness.

Figure 4A:
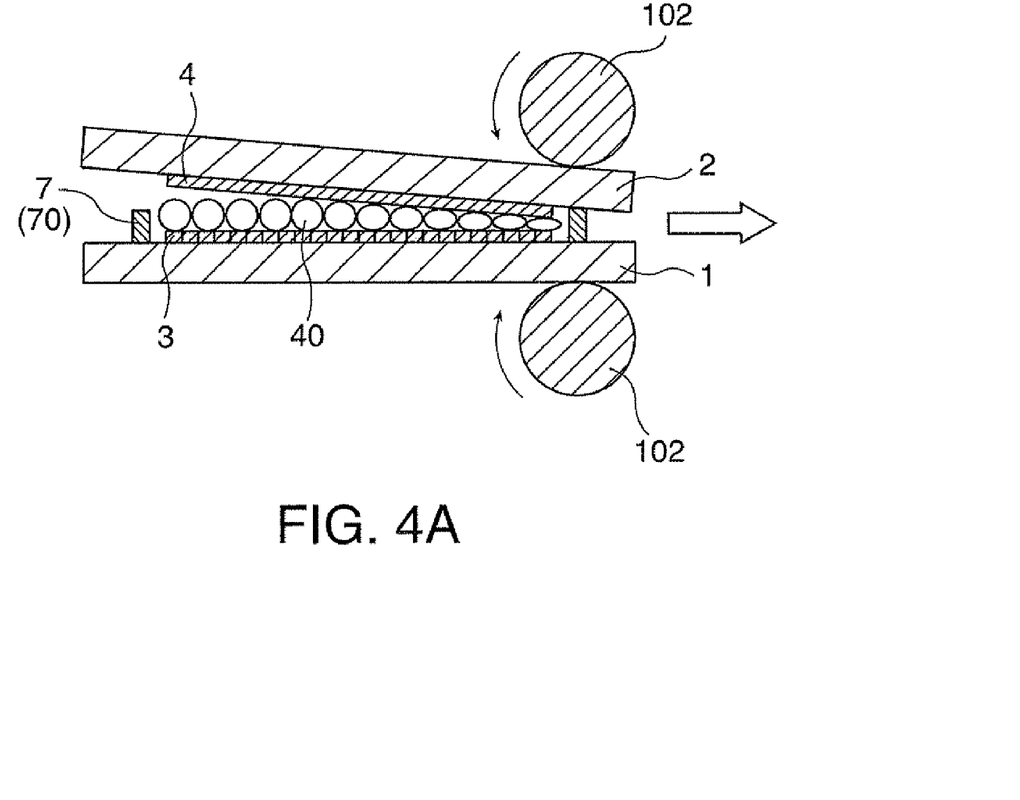
FIGS. 4A and 4B illustrate the method for manufacturing the electrophoretic display illustrated in FIG. 1 (schematic views showing a manufacturing process).

In this case, as shown in FIG. 4A, the first substrate 11 and the second substrate 12 opposite disposed with the wall material 70 interposed between them are heated while being moved through between a pair of rollers 102 and 102 positioning above and below. By heating them in the method mentioned above, while compressing the microcapsules 40 by making the first substrate 11 relatively closer to the second substrate 12, the first base 1 and the second base 2 can be fusion bonded and fixed uniformly with the wall material 70 interposed between them. Since the microcapsules 40 are encapsulated into the sealed space 71 in flattened shapes, the electrophoretic display 20 that has a superior display performance is obtained.

If the wall material 70 is made of thermoplastic resins, the wall material 70 can be fusion bonded with the first base 1 and the second base 2 at relatively low temperature, so that the microcapsules 40, the binder 41, and the like can reliably be prevented from a change in quality and deterioration that are caused by a heat affection in fusion bonding.

In this case, the heating temperature is preferably higher than the fusing point of the thermoplastic resin constituting the wall material 70 and lower than the fusing point of the constituent material of the capsule body (the shell) 401. Accordingly, the microcapsules 40 can be fusion bonded and fixed reliably while they are prevented from a change in quality and deterioration that are caused by the heat.

The heating temperature is, though it is different depending on a composition of the thermoplastic resin or a glass-transition temperature, preferably 80 through 140 degrees centigrade, more preferably 90 through 130 degrees centigrade in particular.

In the embodiment, the distance between the upper surface of the first substrate 11 (or upper surface of the first electrode 3) and the upper surface of the wall material 70 is shorter than the average diameter of the microcapsules 40 on the second process that is before they are encapsulated into the sealed space 71. In this relation, when the microcapsules 40 are encapsulated into the sealed space 71 in the process, they are given a pressure that is more than 1 atmospheric pressure (air pressure). This pressure can compress the microcapsules 40 mainly in up and down direction to make them flatten forms as mentioned above. Consequently, the electrophoretic display 20 that has a superior display performance such as a contrast and the like is obtained.

Specifically, the distance between the upper surface of the first substrate 11 and the upper surface of the wall material 70 is preferably 0.3 through 0.8 times as large as the average diameter of the microcapsules 40 on the second process more preferably 0.4 through 0.7 times as it. Accordingly, the display performance of the electrophoretic display 20 can be more advanced while the microcapsules 40 are prevented from breaking.

The pressure given to the microcapsules 40 is preferably about 0.3 through 2 MPa, more preferably about 0.6 through 1.5 MPa. Accordingly, while the microcapsules 40 are reliably prevented from a break that is caused by the pressure, the area that the color elements of the electrophoretic particles 5 and the like take in the horizontal direction in the microcapsules is maintained sufficiently, so that the display performance of the electrophoretic display 20 can be advanced.

6. Process of Manufacturing Covering Part

Figure 4B:
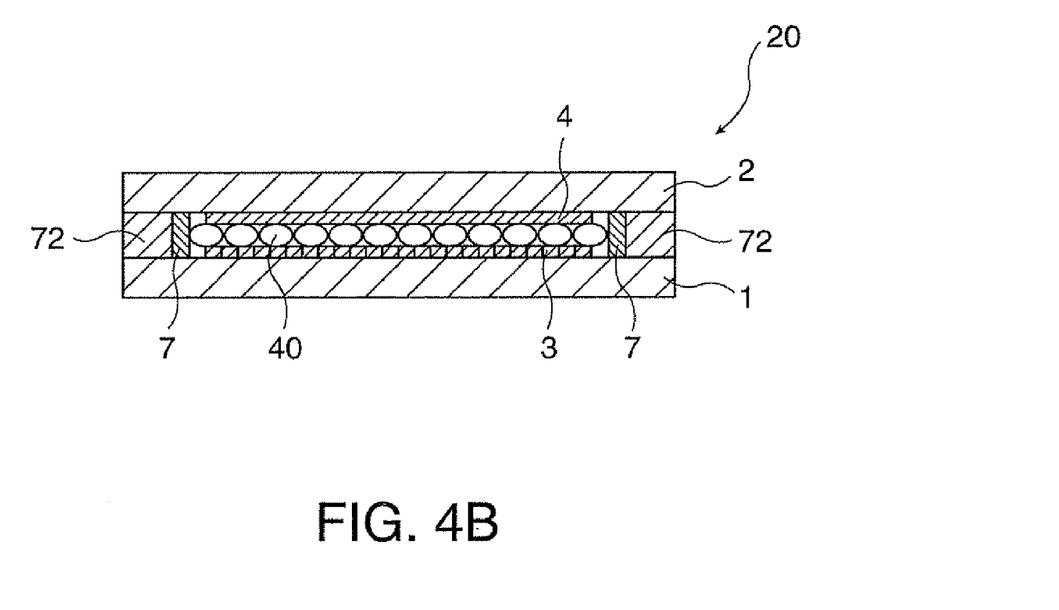

Next, as shown in FIG. 4B, a covering part 72 is formed by covering the exterior side (an opposite side of the sealed space 71) of the spacer 7. The covering part 72 seals the outer periphery part of the electrophoretic display 20.

This process may be done according to need and it may be skipped.

Next, a method for manufacturing an electrophoretic display according to still another embodiment of the present invention will be described.

Figure 5:
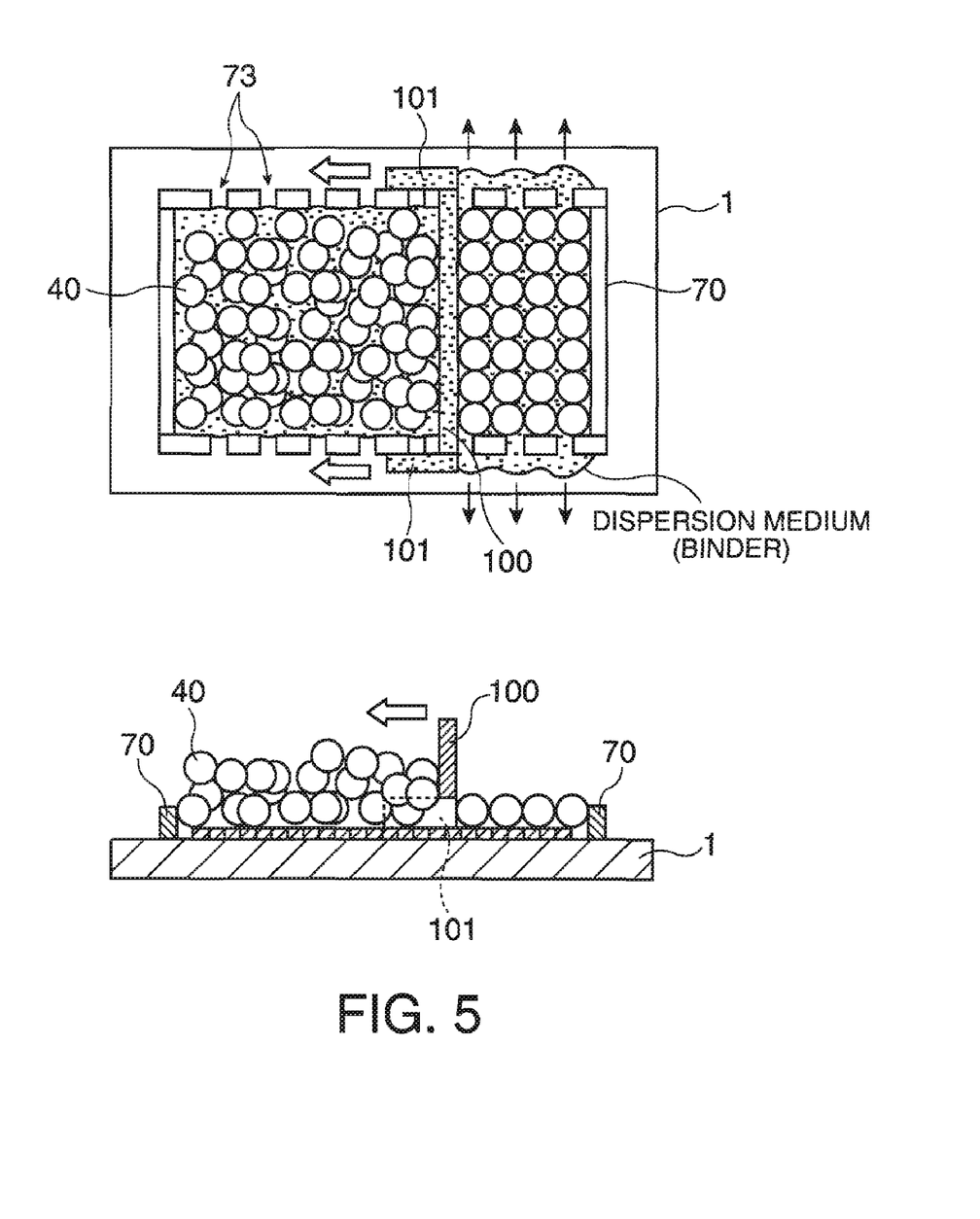
FIG. 5 illustrates a method for manufacturing an electrophoretic display sheet and a method for manufacturing an electrophoretic display according to another embodiment (schematic views showing manufacturing processes).

FIG. 5 is an illustration (a schematic view showing manufacturing processes) showing a method for manufacturing an electrophoretic display sheet and a method for manufacturing an electrophoretic display according to the embodiment. In the illustration, the microcapsules 40 are formed on the first base 1, but they may be formed on the second base 2. In the following description, the upper side in FIG. 5 is described as "up", while the lower side in FIG. 5 is described as "lower" for simplifying the description.

Hereinafter, the manufacturing method of the electrophoretic display of the embodiment is described. Especially, the description is focused mainly on the differences from the manufacturing method of the above embodiment, and the descriptions regarding the common matters are omitted.

The method for manufacturing an electrophoretic display in the embodiment, as shown in FIG. 5, is same as the method for manufacturing it of the above embodiment except that the region 8 is provided with the wall material 70 along its periphery intermittently.

In particular, the wall material 70 is formed intermittently to surround the periphery of the region 8 in the embodiment. In this case, the dispersion medium in the microcapsule dispersion liquid can be drained through gaps provided on the wall material 70 in the second process mentioned above. Accordingly, even if the microcapsule dispersion liquid includes much dispersion medium, the dispersion medium is easily drained, so that it can be used for supplying with the microcapsules 40.

The microcapsule dispersion liquid including much dispersion medium has a lower viscosity, therefore it is easy to be handled on the second process mentioned above. Consequently, operating efficiency can be improved.

The binder 41 included in the microcapsule dispersion liquid may be drained from gaps 73 provided to the wall material 70. In this case, for example, the drained binder 41 may be substituted for forming the covering part 42 by staying outside of the wall material 70 to solidify while filling in the gaps 73. The manufacturing process of the electrophoretic display 20 can be simplified by forming the covering part 42 in the method above.

A measurement (size) of one of the gaps 73 provided to the wall material 70 is preferably smaller than the diameter of the microcapsules 40 provided inside of the wall material 70. Accordingly, the dispersion medium or the binder 41 can be drained while the microcapsules 40 can reliably be prevented from evacuating through the gaps.

Electronic Apparatus

The electrophoretic display 20 mentioned above can be incorporated in various electronic apparatus. An electronic apparatus of the invention equipped with the electrophoretic display 20 will now be described.

Electronic Paper

First, applying the electronic apparatus of the invention to an electronic paper will now be described.

Figure 6:
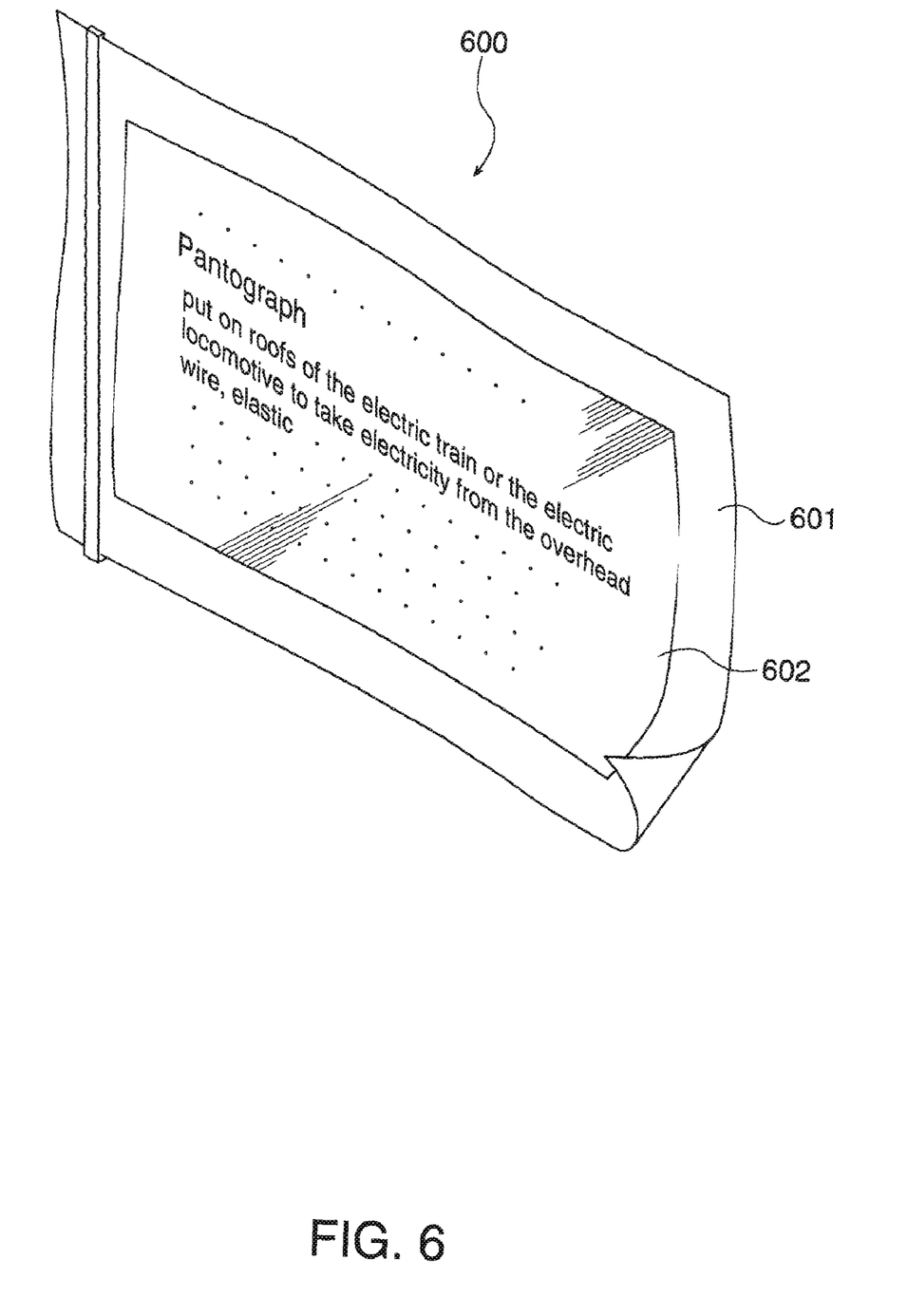
FIG. 6 is a perspective view showing applying an electronic apparatus of an embodiment of the invention to an electronic paper.

FIG. 6 is a perspective view showing applying the electronic apparatus of the invention to an electronic paper.

An electronic paper 600 shown in FIG. 6 includes a main body 601 that is comprised of a rewritable sheet having the same texture and flexibility as those of papers and a display unit 602.

In the electronic paper 600 mentioned above, the display unit 602 is made up of the aforementioned electrophoretic display 20.

Display

Next, applying the electronic apparatus of the invention to a display will be described.

Figure 7A:
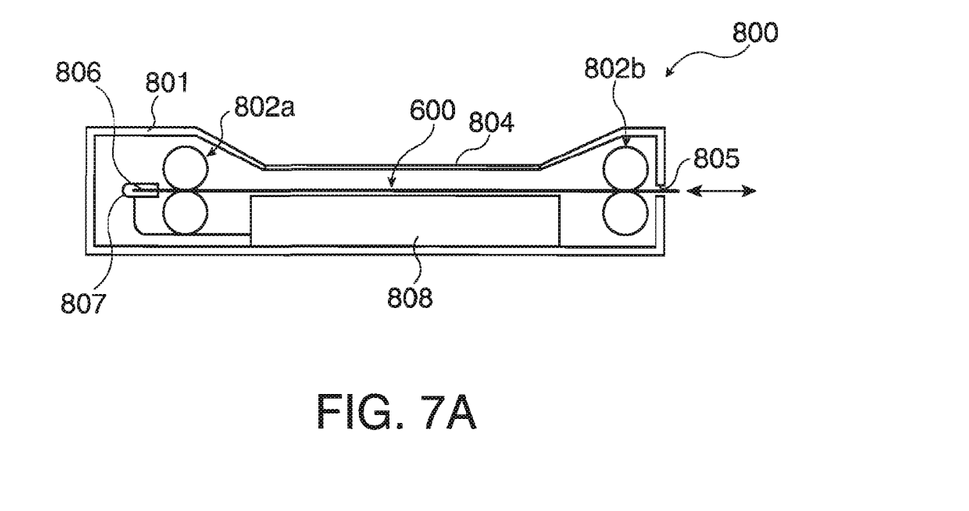
FIG. 7A is a sectional view of a display to which an electronic apparatus of the embodiment is applied.
Figure 7B:
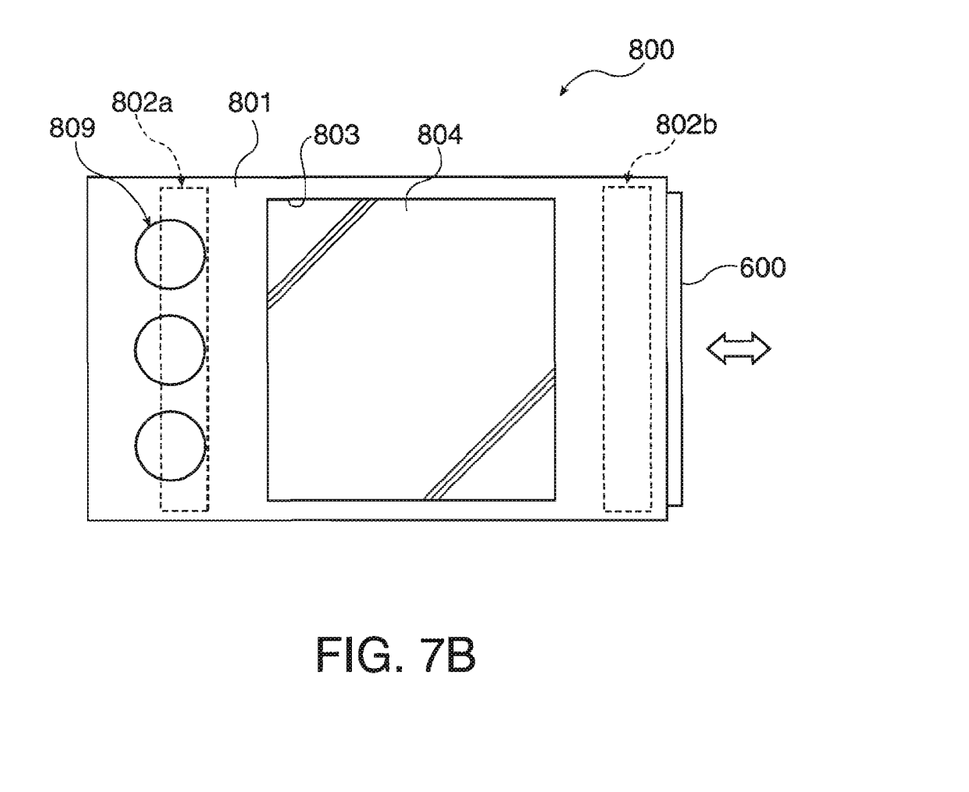
FIG. 7B is a plain view of the display to which the electronic apparatus of the embodiment is applied.

FIGS. 7A and 7B show applying the electronic apparatus of the invention to a display. FIG. 7A is a sectional view, and FIG. 7B is a plain view.

A display (a display) 800 shown in FIG. 7 includes a main body 801, and the electronic paper 600 that can be attached to the main body 801 and removed from it. The electronic paper 600 has a structure as mentioned above, that is the same structure as that shown in FIG. 6.

An insertion slot 805 in which the electronic paper 600 can be inserted is formed on a side face (right side in FIG. 7) of the main body 801 and two pairs of feeding rollers 802*a* and 802*b* are provided inside of the main body 801. If the electronic paper 600 is inserted into the main body 801 through the insertion slot 805, it is placed in the main body 801 in a state that it is held between the feed rollers 802*a* and 802*b*.

A rectangular opening 803 is formed on a display side (a front side in FIG. 7A) of the main body 801., and a transparent glass plate 804 is embedded in the opening 803. Accordingly, the electronic paper 600 placed in the main body 801 can be viewed from the outside of the main body 801. That is, in the display 800, the electronic paper 600 that is placed in the main body 801 is viewed through the transparent glass plate 804, thereby a display surface is provided.

A terminal member 806 is provided on a fore-end in the insertion direction of the electronic paper 600 (the left side in FIG. 7), and a socket 807 to which the terminal member 806 is coupled while the electronic paper 600 is placed in the main body 801, is provided inside of the main body 801. A controller 808 and an operating unit 809 are electrically connected to the socket 807.

In the display 800 mentioned above, since the electronic paper 600 is detachably provided with the main body 801, it can be carried in a detached state from the main body 801 to be used.

In addition, in the display 800 mentioned above, the electronic paper 600 includes the electrophoretic display 20 as above.

Note that applications of the electronic apparatus of the present invention are not limited to those described above. The electrophoretic display 20 can be applied to displays of the following various electronic apparatus: for example, a television, a video tape recorder of a view-finder type or a monitor viewing type, a car navigation system, a pager, a personal digital assistance, an electronic calculator, an electronic newspaper, a word processor, a personal computer, a workstation, a picture phone, a POS terminal, a device provided with a touch panel and the like.

The method for manufacturing an electrophoretic display sheet; the electrophoretic display sheet; the electrophoretic display; and the electronic apparatus of the present invention is described based on the embodiments illustrated in figures, but the application of the invention is not limited to those described above. The structure of each part can be substituted to an optional structure that has similar functions. In other instances, other optional components can be added to the structure of the present invention described above.

In the embodiments described above, a structure that a pair of electrodes is provided to face each other is illustrated, but it is not limited to that, for example, the present invention can be applied to a structure that a pair of electrodes is provided on the same base.

In the embodiments described above, a structure that a pair of substrates is provided to face each other is illustrated, but it is not limited to that, for example, the present invention can be applied to a structure that single substrate is provided.

In addition, in the embodiments described above, one of the microcapsules is disposed to straddle two adjacent picture electrodes (electrodes), but it is not limited to that. For example, one of the microcapsules may be disposed to straddle three adjacent picture electrodes or disposed without straddling a plurality of adjacent picture electrodes. In addition, these arrangements can be mixed.

In the embodiments mentioned above, a single microcapsule is disposed to two picture electrodes, but it is not limited to that. For example, a single microcapsule may be located to a single picture electrode, or a plurality of microcapsules may be located to a single electrode. A single microcapsule also may be located to more than three picture electrodes.

The method for manufacturing an electrophoretic display sheet and the method for manufacturing an electrophoretic display may be added one or more than one optional operation.

What is claimed is:

1. A method of manufacturing an electrophoretic display sheet, comprising:

forming a wall material on a first substrate, the wall material defining a disposing region, the wall material being formed in a frame shape that surrounds the entire disposing region and being disposed between the first and the second substrate;

disposing a plurality of microcapsules to the disposing region, each of the plurality of microcapsules including an electrophoretic dispersion liquid in a shell, the plurality of microcapsules being pervaded into every corner of the disposing region by making a surface of the plurality of microcapsules higher than an upper surface of the wall material; and arranging uniformly a part of the plurality of microcapsules on the disposing region and draining a remainder of the plurality of microcapsules from the dispersing region at the same time by rubbing the wall material with a plate to sweep the plurality of microcapsules.

2. The method of manufacturing an electrophoretic display sheet according to claim 1, an average height of the wall material being 0.3 through 0.8 times as large as the average diameter of each of the plurality of microcapsules.

3. The method of manufacturing an electrophoretic display sheet according to claim 1, the plate being moved on the first substrate, using the wall material as a guide during the arranging the plurality of microcapsules.

4. The method of manufacturing an electrophoretic display sheet according to claim 1, the first substrate being moved against the plate, using the wall material as a guide during the arranging the plurality of microcapsules.

5. The method of manufacturing an electrophoretic display sheet according to claim 1, the plate including a positioning member at both ends in a longitudinal direction thereof, the positioning member positioning the plate to the wall material that is approximately perpendicular to a direction in which the plate sweeps.

6. The method of manufacturing an electrophoretic display sheet according to claim 5, the disposing region being rectangular in shape, and the plate being moved by making the positioning member follow along an exterior face of the wall material provided to two faced sides of the disposing region.

7. The method of manufacturing an electrophoretic display sheet according to claim 1, the wall material including a resin material.

8. The method of manufacturing an electrophoretic display sheet according to claim 1, a minimum distance between the first substrate and the plate during the rubbing the wall material with the plate being 1.0 through 1.9 times as large as an average diameter of each of the plurality of microcapsules.

9. The method of manufacturing an electrophoretic display sheet according to claim 1, a height of the wall material on the first substrate being smaller than the average diameter of each of the plurality of microcapsules.

10. A method of manufacturing an electrophoretic display, comprising:
- forming a wall material on a first substrate, the wall material defining a disposing region, the wall material being formed in a frame shape that surrounds the entire disposing region and being disposed between the first and the second substrate;
- disposing a plurality of microcapsules to the disposing region, each of the plurality of microcapsules including an electrophoretic dispersion liquid in a shell, the plurality of microcapsules being pervaded into every corner of the disposing region by making a surface of the plurality of microcapsules higher than an upper surface of the wall material;
- arranging uniformly a part of the plurality of microcapsules on the disposing region and draining a remainder of the plurality of microcapsules from the disposing region at the same time by rubbing the wall material with a plate to sweep the plurality of microcapsules; and
- disposing a second substrate on the first substrate to bind the at least a part of the plurality of the microcapsules between the first and the second substrate, using the wall material as a spacer between the first and the second substrate.

11. An electrophoretic display manufactured by the method for manufacturing an electrophoretic display according to claim 10.

12. A method of manufacturing an electrophoretic display sheet, comprising:
- forming a wall material on a first substrate, the wall material defining a disposing region;
- disposing a plurality of microcapsules to the disposing region, each of the plurality of microcapsules including an electrophoretic dispersion liquid in a shell; and
- arranging at least a part of the plurality of microcapsules on the disposing region by rubbing the wall material with a plate to sweep the plurality of microcapsules,
- the wall material including a thermoplastic resin, the first and the second substrate being fusion bonded to each other by heating the wall material during the disposing the second substrate on the first substrate, and
- a heating temperature in the heating the wall material being higher than a fusing point of the thermoplastic resin and lower than a fusing point of a constituent material of the shell of each of the plurality of microcapsules.

13. A method of manufacturing an electrophoretic display, comprising:
- forming a wall material on a first substrate, the wall material defining a disposing region, the wall material being formed in a frame shape that surrounds the entire disposing region and being disposed between the first and the second substrate;
- disposing a plurality of microcapsules to the disposing region, each of the plurality of microcapsules including an electrophoretic dispersion liquid in a shell;
- arranging at least a part of the plurality of microcapsules on the disposing region by rubbing the wall material with a plate to sweep the plurality of microcapsules; and
- disposing a second substrate on the first substrate to bind the at least a part of the plurality of the microcapsules between the first and the second substrate, using the wall material as a spacer between the first and the second substrate,
- the second substrate pressing the at least a part of the plurality of the microcapsules during the disposing the second substrate on the first substrate, a pressure given to the at least a part of the plurality of the microcapsules being 0.3 through 2 MPa during the pressing.

* * * * *